(12) United States Patent
Larsson et al.

(10) Patent No.: US 11,713,005 B2
(45) Date of Patent: Aug. 1, 2023

(54) METHOD AND FASTENING DEVICE FOR FASTENING A LINING ELEMENT

(71) Applicant: Metso Sweden AB, Trelleborg (SE)

(72) Inventors: Fredrik Larsson, Malmö (SE); Henrik Persson, Trelleborg (SE); Aleksi Huhtala, Lohtaja (FI); Jukka Lämpsä, Ruotsalo (FI); Michael Gyberg, Malmö (SE)

(73) Assignee: Metso Sweden AB, Trelleborg (SE)

( * ) Notice: Subject to any disclaimer, the term of this patent is extended or adjusted under 35 U.S.C. 154(b) by 509 days.

(21) Appl. No.: 16/623,896

(22) PCT Filed: Jun. 21, 2018

(86) PCT No.: PCT/EP2018/066675
§ 371 (c)(1),
(2) Date: Dec. 18, 2019

(87) PCT Pub. No.: WO2018/234510
PCT Pub. Date: Dec. 27, 2018

(65) Prior Publication Data
US 2021/0146856 A1    May 20, 2021

(30) Foreign Application Priority Data

Jun. 22, 2017 (EP) .................................... 17177447

(51) Int. Cl.
*F16B 13/04* (2006.01)
*B60R 13/01* (2006.01)
(Continued)

(52) U.S. Cl.
CPC .......... *B60R 13/01* (2013.01); *B25B 23/0085* (2013.01); *B25B 27/0007* (2013.01);
(Continued)

(58) Field of Classification Search
CPC ........ F16B 13/061; F16B 5/02; F16B 5/0088; F16B 5/04; B25B 23/0085
(Continued)

(56) References Cited

U.S. PATENT DOCUMENTS 3,953,950 A * 5/1976 Sudyk ..................... B60R 13/01
  52/630
4,111,481 A * 9/1978 Nix ......................... B60R 13/01
  220/23.9

(Continued)

FOREIGN PATENT DOCUMENTS

DE    10201593 A1    8/2003
DE    10253888 A1    12/2003
(Continued)

OTHER PUBLICATIONS

International Search Report and Written Opinion for International Application No. PCT/EP2018/066675 dated Sep. 21, 2018.
(Continued)

*Primary Examiner* — Gary W Estremsky
(74) *Attorney, Agent, or Firm* — Andrus Intellectual Property Law, LLP (57) ABSTRACT

A method and fastening device for use in heavy duty machinery for fastening a lining element to a surface of a body steel plate is disclosed. An assembly, a truck and a handling tool utilizing the method and fastening device is also disclosed.

16 Claims, 12 Drawing Sheets

(51) Int. Cl.
*B25B 23/00* (2006.01)
*B25B 27/00* (2006.01)
*F16B 5/02* (2006.01)
*F16B 33/00* (2006.01)
*F16B 37/06* (2006.01)

(52) U.S. Cl.
CPC .............. *F16B 5/02* (2013.01); *F16B 33/002* (2013.01); *F16B 37/062* (2013.01)

(58) Field of Classification Search
USPC .... 411/396, 371.2, 80.5, 80.6, 34; 296/39.2, 296/41
See application file for complete search history.

(56) References Cited

U.S. PATENT DOCUMENTS

| | | | | |
|---|---|---|---|---|
| 4,890,964 A * | 1/1990 | Lindley | ................... | F16B 39/36 411/324 |
| 5,185,980 A * | 2/1993 | Rydberg | ............... | B02C 17/225 52/506.09 |
| 5,509,765 A * | 4/1996 | Albin | ................... | F16B 13/061 411/344 |
| 5,851,043 A * | 12/1998 | Moutrey | ................ | B60R 13/01 296/39.2 |
| 8,801,348 B2 * | 8/2014 | Jordan | ................ | F16B 19/1072 411/57.1 |
| 2001/0035661 A1 * | 11/2001 | Doshi | .................... | B60R 13/01 296/39.1 |
| 2005/0163585 A1 | 7/2005 | Bodin | | |
| 2008/0201933 A1 | 8/2008 | Wille | | |
| 2008/0206011 A1 * | 8/2008 | Wille | ................... | F16B 13/061 411/34 |
| 2012/0011702 A1 * | 1/2012 | Pratt | ........................ | F16B 5/04 411/34 |
| 2015/0061311 A1 * | 3/2015 | Natarajan | ............... | B60R 13/01 296/39.2 |
| 2015/0139747 A1 * | 5/2015 | Hsu | ........................ | B21D 51/36 411/43 |
| 2016/0040703 A1 * | 2/2016 | Schnaufer | ................. | F16B 5/02 411/34 |
| 2018/0038406 A1 * | 2/2018 | Makino | ................. | F16B 37/067 |
| 2019/0224818 A1 * | 7/2019 | Persson | ................... | B25B 13/48 |
| 2021/0123467 A1 * | 4/2021 | Takeda | .................... | F16B 43/00 |

FOREIGN PATENT DOCUMENTS

| | | |
|---|---|---|
| EP | 1961976 B1 | 8/2008 |
| RU | 2217629 C1 | 11/2003 |

OTHER PUBLICATIONS

Communication issued in corresponding European Patent Application No. 18731148.5 dated Nov. 5, 2021.
Translation of Preliminary Opinion for corresponding Ukrainian Patent Application No. a 2019 11818 dated Jan. 11, 2022.
English translation of Office Action and Search Report for corresponding Russian Patent No. 2019141310/12 dated Sep. 16, 2021.

* cited by examiner

METHOD AND FASTENING DEVICE FOR FASTENING A LINING ELEMENT

CROSS-REFERENCE TO RELATED APPLICATIONS

This application is the U.S. national stage application of International Application PCT/EP2018/066675, filed Jun. 21, 2018, which international application was published on Dec. 27, 2018, as International Publication WO 2018/234510 A1 in the English language. The International Application claims priority of European Patent Application No. 17177447.4 filed Jun. 22, 2017.

TECHNICAL FIELD

The invention relates to a method and fastening device for use in heavy duty machinery for fastening a lining element to a surface of a body steel plate. The invention also relates to an assembly, a truck and a handling tool.

BACKGROUND ART

Wear-resistant linings are known and used both in chutes and on truck platforms for protecting the base. They usually consist of natural or synthetic rubber and polyurethane and are to protect from hard impacts by rocks and wear exerted by material moving over and in contact with the surface of the lining element. Relatively soft rubber materials provide good resistance to wear, but to prevent hard impacts from breaking through the lining element, this must be given a large thickness. Harder rubber materials provide better protection from impacts, but are more susceptible to abrasive wear. Therefore, lining elements have been developed, in which different materials are combined in the outwardly directed surface of the element, over which surface material in the form of pieces or particles, such as crushed ore and crushed rock material, is intended to move.

A problem when using such lining elements in order to protect a surface from wear, such as a surface on a haul truck body, is that material tends to find its way in under the lining element by travelling in between an edge of the lining element and the surface the edge is to bear against. This is a problem since the material gradually will loosen the lining element from the surface to which it is attached such that the lining element eventually will fall off. Additionally, the truck will carry around unwanted weight, leading to reduced capacity, higher fuel consumption and in turn higher costs than necessary.

Another problem is that the current attachment methods normally involves stud bolts that are welded onto the surface to be protected. Not only is this a time-consuming procedure but it also requires lining elements with a substantial height in order to protect the stud bolts from getting impact damages during use which may result in that the wear-resistant lining elements detach. Also, the stud bolts are likely to be destroyed during demounting of the lining elements.

SUMMARY OF THE INVENTION

It is an objective of the present invention to mitigate, alleviate or eliminate one or more of the above-identified deficiencies in the art and disadvantages singly or in any combination and solve at least the above mentioned problems.

According to a first aspect of the invention, these and other objects, and/or advantages that will be apparent from the following description of embodiments, are achieved, in full or at least in part, by a method for use in heavy-duty machinery for fastening a lining element to a surface of a body steel plate, such as a haul truck body, the lining element having at least one fastening portion defining a mounting hole. The method comprises placing the lining element on the surface, the surface having a rivet nut with a rivet head received therein; and inserting and tightening a bolt having a bolt head into the rivet nut, for pressing at least one fastening portion of the lining element against the surface of the body steel plate.

By using rivet nuts, the installation and replacement process of the lining elements is made much more efficient. For example, the welding phase may be completely eliminated from the process.

Another advantage is that the bolts that are used for the fastening of the lining elements will not be destroyed during demounting and may thus be re-used upon replacement of the lining elements.

The new fastening method is further advantageous in that the height of the lining elements can be decreased since the overall distance that the fastening components are protruding from the bottom of the lining element is decreased.

Yet another advantage is that any work conducted by service personnel from the underside of the body steel plate may now be avoided.

The rivet nut may be arranged in the surface of the body steel plate such that the rivet head will extend beyond the mounting hole of the fastening portion of the lining element when the lining element is placed on the surface of the body steel plate.

The method may further comprise initially inserting a rivet nut having a rivet head into a through hole of the body steel plate such that the rivet head engages the surface; and compressing the rivet nut for attachment to the body steel plate.

The method may further comprise placing a washer on the fastening portion of the lining element with the rivet nut being received in a central opening of the washer. The washer may be a rotational-locking washer and the central opening may be shaped and configured to receive the rivet head in a rotationally locked engagement.

The method may further comprise engaging a tool in at least one tool-engagement portion of the washer for preventing rotation of the washer, and thereby preventing rotation of the rivet nut, during tightening of the bolt. Preferably, the method may further comprise engaging the tool in the tool-engaging portion in a direction parallel with a longitudinal direction of the bolt.

The method may, prior to inserting and tightening the bolt into the rivet nut, further comprise placing a fastening washer between the bolt head and the fastening portion for axial transmission of force from the bolt head to the fastening portion.

According to a second aspect of the invention, these and other objects are achieved, in full or at least in part, by a fastening device for use in heavy-duty machinery for fastening a lining element to a surface of a body steel plate, such as a haul truck body. The fastening device comprises a rivet nut having a rivet head and an inner threading, the rivet nut being configured to be inserted into a through hole of the body steel plate such the rivet head engages the surface and being configured to be subsequently compressed for attachment to the body steel plate; a rotational-locking washer having a central opening being shaped and configured to receive the rivet head in a rotationally locked engagement; and a fastening bolt being configured to engage with the inner threading of the rivet nut and having a bolt head configured to press the rotational-locking washer towards the surface of the body steel plate. The rotational-locking washer may further comprise at least one tool-engagement portion configured to engage with a tool for preventing rotation of the washer, and thereby preventing rotation of the rivet nut, during fastening of the lining element between the rotational-locking washer and the surface.

The fastening device may further comprise a fastening washer arranged between the bolt head and a fastening portion of the lining element for axial transmission of force from the bolt head to the fastening portion of the lining element.

The fastening washer may be arranged between the bolt head and the rotational-locking washer.

The rivet head may be non-circular.

The shape of the central opening of the rotational-locking washer may correspond to the shape of the rivet head.

The tool-engagement portion may comprise at least one groove. The tool-engaging portion is preferably accessible in a direction parallel with a longitudinal direction of the bolt, such that a tool can be applied to the tool-engaging portion of the washer from above.

According to a third aspect of the invention, these and other objects are achieved, in full or at least in part, by an assembly comprising a body steel plate, a lining comprising a plurality of lining elements which is intended for a surface on the body steel plate subjected to wear, each lining element having an outwardly directed surface, over which material in the form of pieces or particles, such as crushed ore and crushed rock material, is intended to move, and having an inwardly directed surface intended to face the body steel plate, and a fastening device according to the second aspect of the invention for fastening the lining elements to a surface of the body steel plate.

Each lining element may comprise a rubber lining and a steel reinforcement plate.

The steel reinforcement plate may be at least partly moulded into the rubber lining.

Each lining element may comprise at least one fastening portion formed in the steel reinforcement plate.

The fastening portion may define a mounting hole through which the rivet nut of the fastening device is configured to be inserted.

Each lining element may comprise at least one opening in the rubber lining for access to the fastening portion of the steel reinforcement plate.

According to a fourth aspect of the invention, these and other objects are achieved, in full or at least in part, by a truck having a haul truck body comprising an assembly according to the third aspect of the invention.

According to a fifth aspect of the invention, these and other objects are achieved, in full or at least in part, by a handling tool for use in connection with the method according to the first aspect of the invention, and/or the fastening device according to second aspect of the invention.

Effects and features of the second to the fifth aspect of the present invention are largely analogous to those described above in connection with the first aspect of the inventive concept. Embodiments mentioned in relation to the first aspect of the present invention are largely compatible with the further aspects of the invention.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise.

As used herein, the term "comprising" and variations of that term are not intended to exclude other additives, components, integers or steps.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

Figures 1A, 1B:
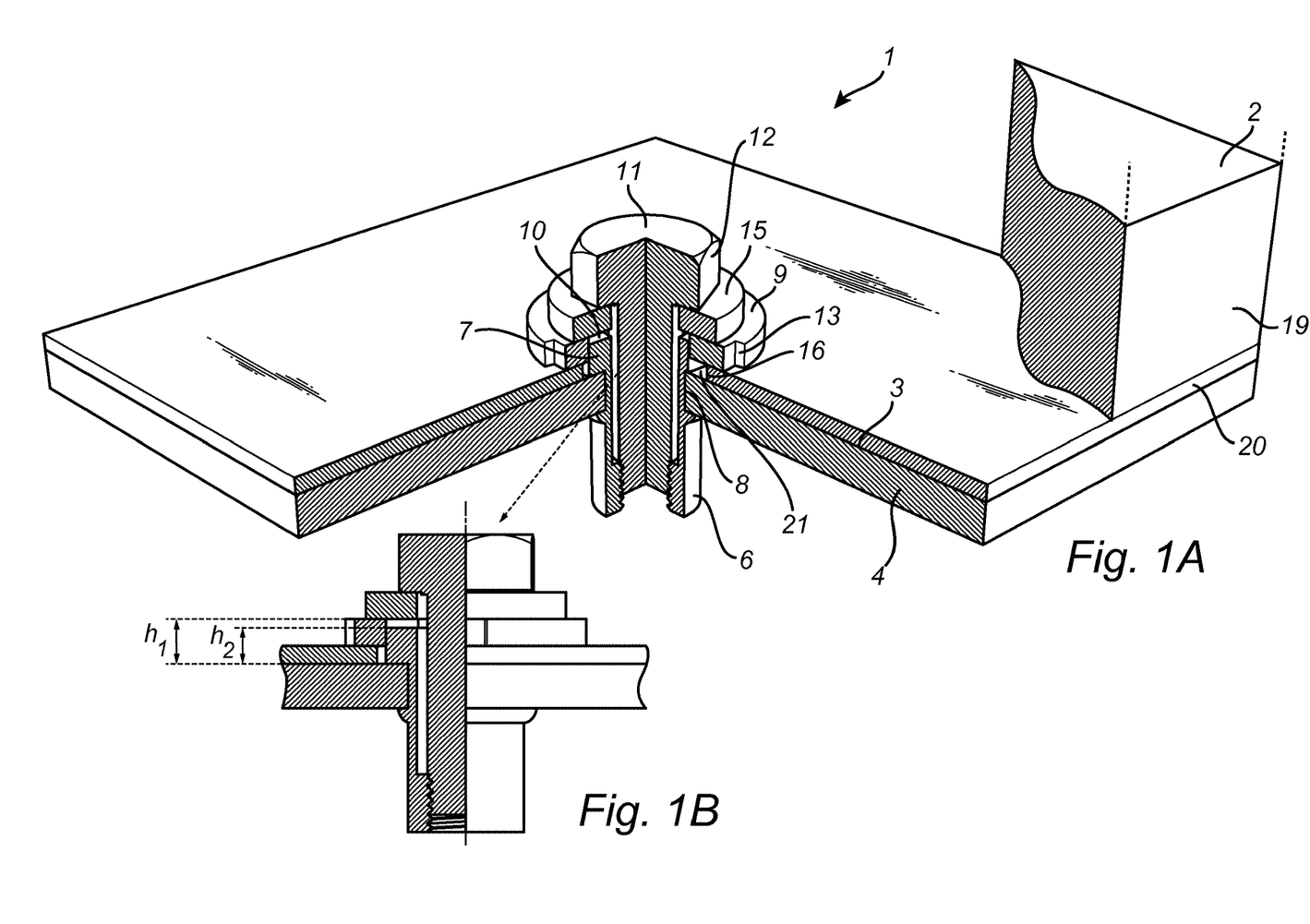
FIGS. 1A and 1B are perspective views of an exemplary embodiment of a fastening device according to a second aspect of the invention.

FIGS. 1A and 1B illustrate a fastening device 1 according to one exemplary embodiment for use in heavy-duty machinery for fastening a lining element 2 to a surface 3 of a body steel plate 4, such as a haul truck body 5.

The fastening device 1 comprises a rivet nut 6 having a rivet head 7 and an inner threading. The rivet nut 6 is configured to be inserted into a through hole 8 of the body steel plate 4 such that the rivet head 7 engages the surface 3 of the body steel plate 4 and configured to thereafter be compressed for attachment to the body steel plate 4.

The fastening device 1 further comprises a rotational-locking washer 9 having a central opening 10 which is shaped and configured to receive the rivet head 7 in a rotationally locked engagement, and a fastening bolt 11 which is configured to engage with the inner threading of the rivet nut 6 and which has a bolt head 12 configured to press the rotational-locking washer 9 towards the surface 3 of the body steel plate 4. The shape of the central opening 10 of the rotational-locking washer 9 corresponds to the shape of the rivet head 7, which is non-circular.

The rotational-locking washer 9 has a tool-engagement portion 13 configured to engage with a tool 14 for preventing rotation of the rotational-locking washer 9, and thereby preventing rotation of the rivet nut 6, during fastening of the lining element 2 between the rotational-locking washer 9 and the surface 3.

In this embodiment, the fastening device 1 further comprises a fastening washer 15 arranged between the bolt head 12 and a fastening portion 16 of the lining element 2 for axial transmission of force from the bolt head 12 to the fastening portion 16 of the lining element 2. The fastening washer 15 is arranged between the bolt head 12 and the rotational-locking washer 9.

As illustrated in FIG. 1B, the total height $h_1$ of fastening portion 16 and the rotational-locking washer 9 exceeds the height $h_2$ of the rivet head 7 that protrudes above the body steel plate 4. This is to make sure that the axial transmission of force from the bolt head 12 is received by the fastening portion 16 of the lining element 2, which thereby is pressed against the surface 3 of the steel body plate 4, and not by the rivet head 7 protruding above the body steel plate 4.

Figure 2A:
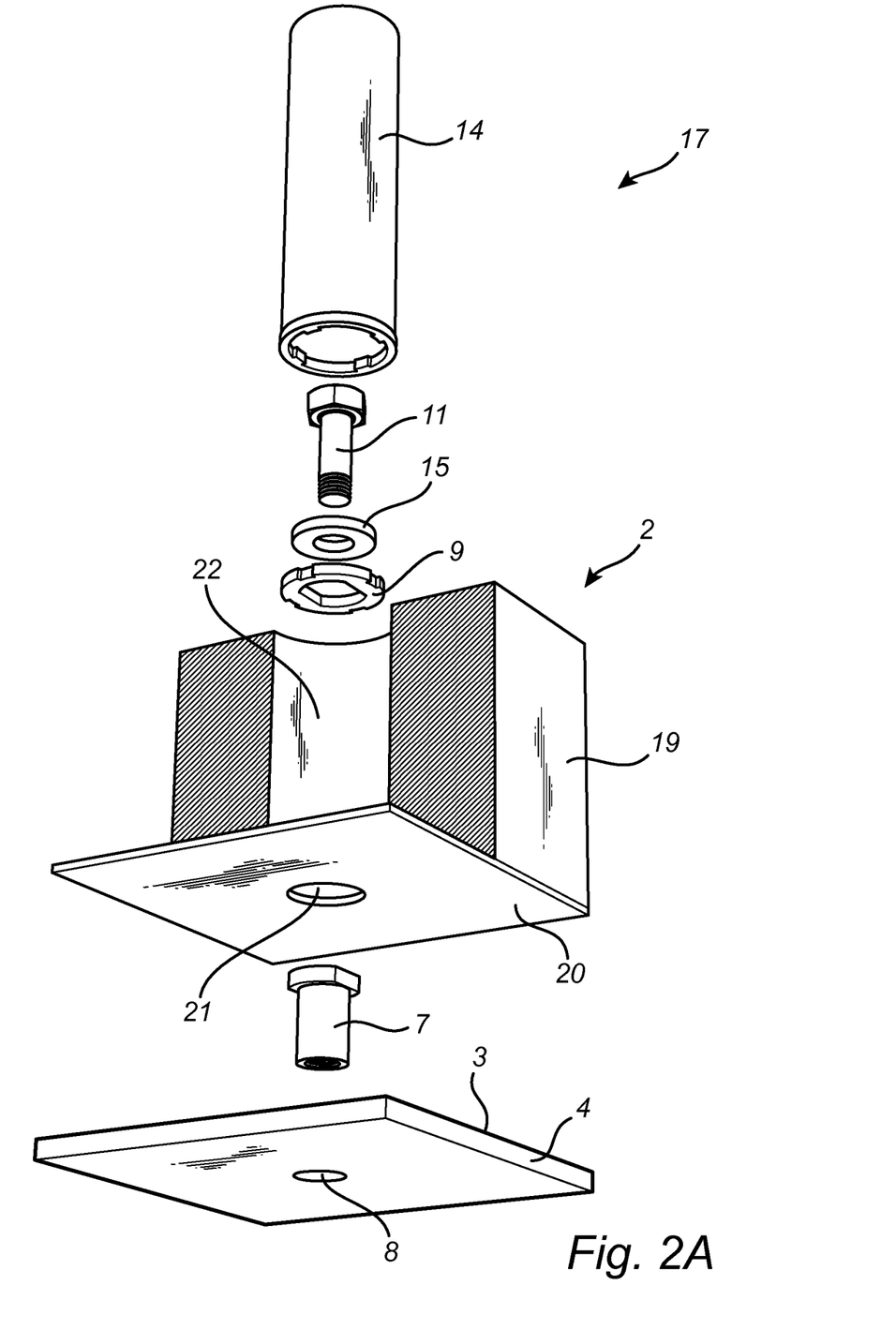
FIG. 2A to 2C are perspective views of an exemplary embodiment of an assembly according to a third aspect of the invention.
Figure 2B:
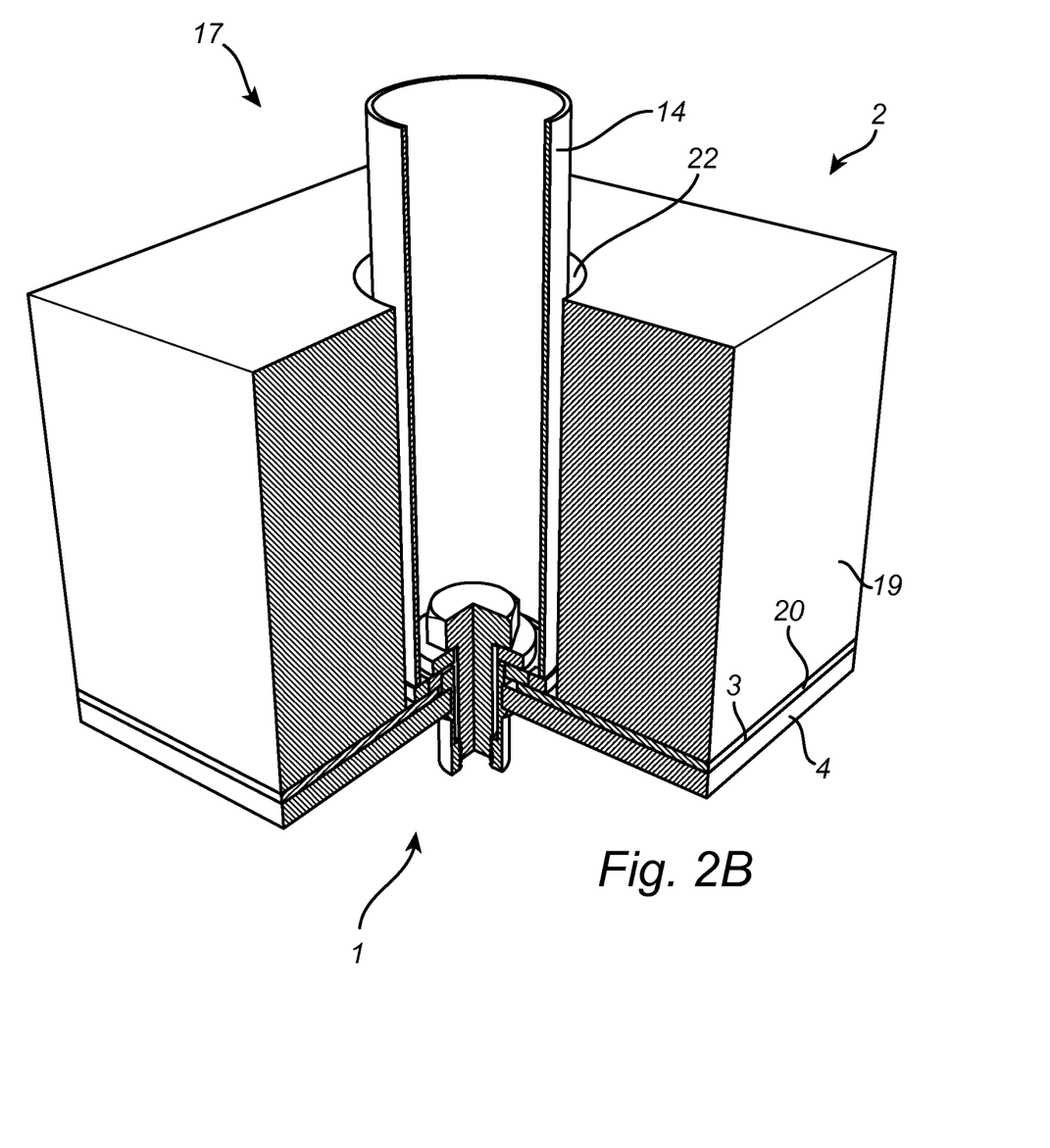
Figure 2C:
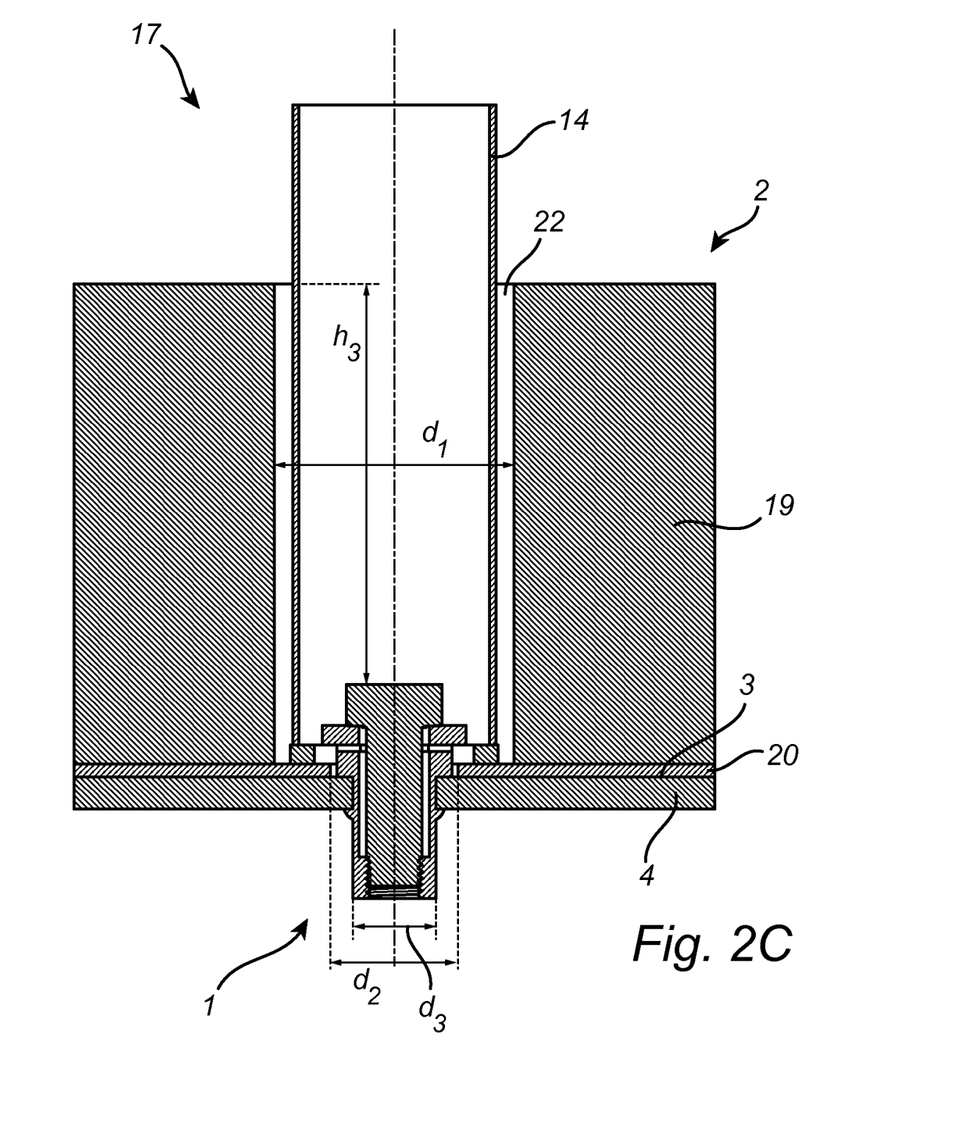

FIG. 2A to 2C illustrate an assembly 17 according to one exemplary embodiment of the invention. The assembly 17 comprises the body steel plate 4 and a lining 18 having a plurality of lining elements 2 intended for the surface 3 on the body steel plate 4 subjected to wear. The assembly 17 further comprises a plurality of fastening devices 1 for fastening the lining elements 2 to the surface 3 of the body steel plate 4.

Each lining element 2 has an outwardly directed surface, over which material in the form of pieces or particles, such as crushed ore and crushed rock material, is intended to move, and an inwardly directed surface intended to face the body steel plate 4.

Each lining element 2 also comprises a rubber lining 19 and a steel reinforcement plate 20. The steel reinforcement plate 20 is attached to or at least partly moulded into the rubber lining 19 and comprises the fastening portion 16. The fastening portion 16 defines a mounting hole 21 through which the rivet nut 6 of the fastening device 1 is configured to be inserted. Each lining element 2 further comprises an opening 22 in the rubber lining 19 for access to the fastening portion 16 of the steel reinforcement plate 20.

In FIG. 2C it is illustrated that the opening 22 in the rubber lining 19 has a larger diameter $d_1$ than the diameter $d_2$ of the mounting hole 21 in the fastening portion 16 of the reinforcement plate 20. This is a necessity in order to be able to reach the rotational-locking washer 9 with the tool 14 when the bolt 11 is to be tightened in the rivet nut 6 upon attachment of the lining element 2 to the body steel plate 4. The through hole 8 of the body steel plate 4 naturally has the smallest diameter $d_3$ in order to fit the rivet nut 6 which engages with the surface 3 of the body steel plate 4.

The height $h_3$ from the top of the bolt head 12 of the fastening bolt 11 up to the top of the rubber lining 19 is also marked in FIG. 2C. The height $h_3$ is referred to as the safety distance for the fastening device 1 upon impact of a material on the lining element 21. The fastening device 1 is a more compact solution than the conventional methods for fastening the lining elements 2 to the body steel plate 4. This makes it possible to decrease the overall height of the rubber lining 19 while still maintaining the same safety distance $h_3$. As a result, the weight of the lining elements 2 is also decreased.

FIG. 3A to 3H illustrate one exemplary embodiment of a method for use in heavy-duty machinery for fastening the lining element 2 to the surface 3 of the body steel plate 4 when the lining element 2 has at least one fastening portion 16 defining the mounting hole 21.

Initially, it should be noted that there are basically two different scenarios for using the fastening method, initial fastening (manufacturing) or maintenance (replacement) of the lining elements 2.

Figure 3A:
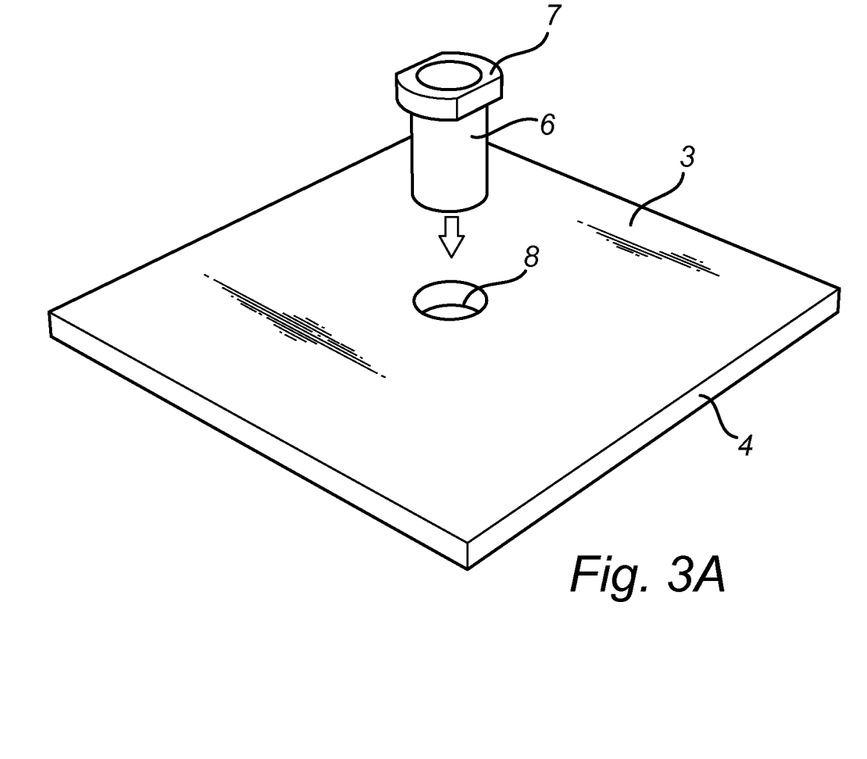
FIG. 3A to 3H are perspective view of steps in an exemplary embodiment of a method for use in heavy-duty machinery for fastening a lining element to a surface of a body steel plate according to a first aspect of the invention.
Figure 3B:
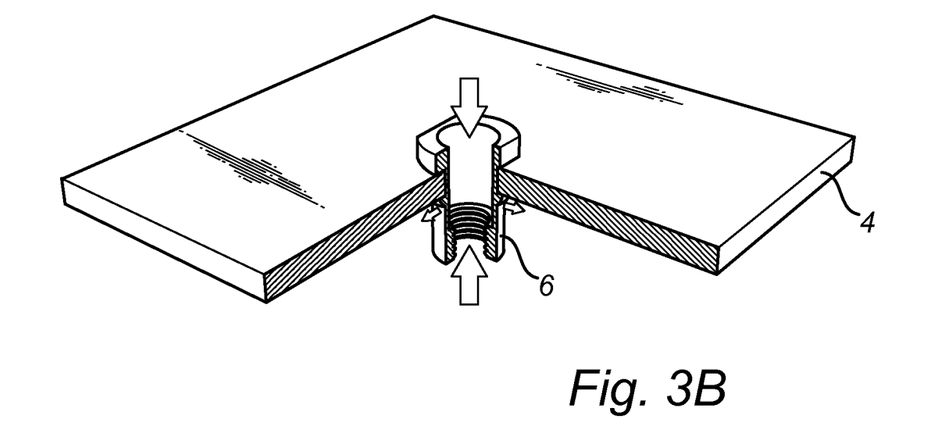
Figure 3C:
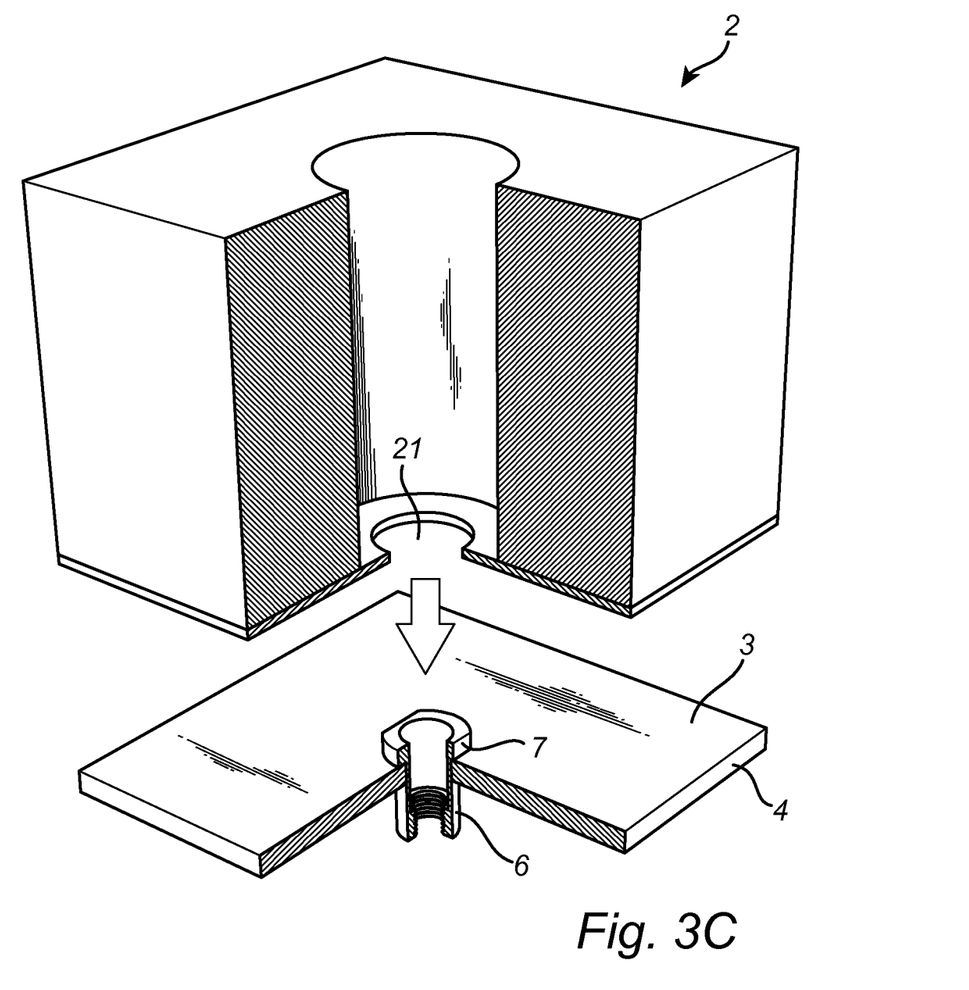
Figure 3D:
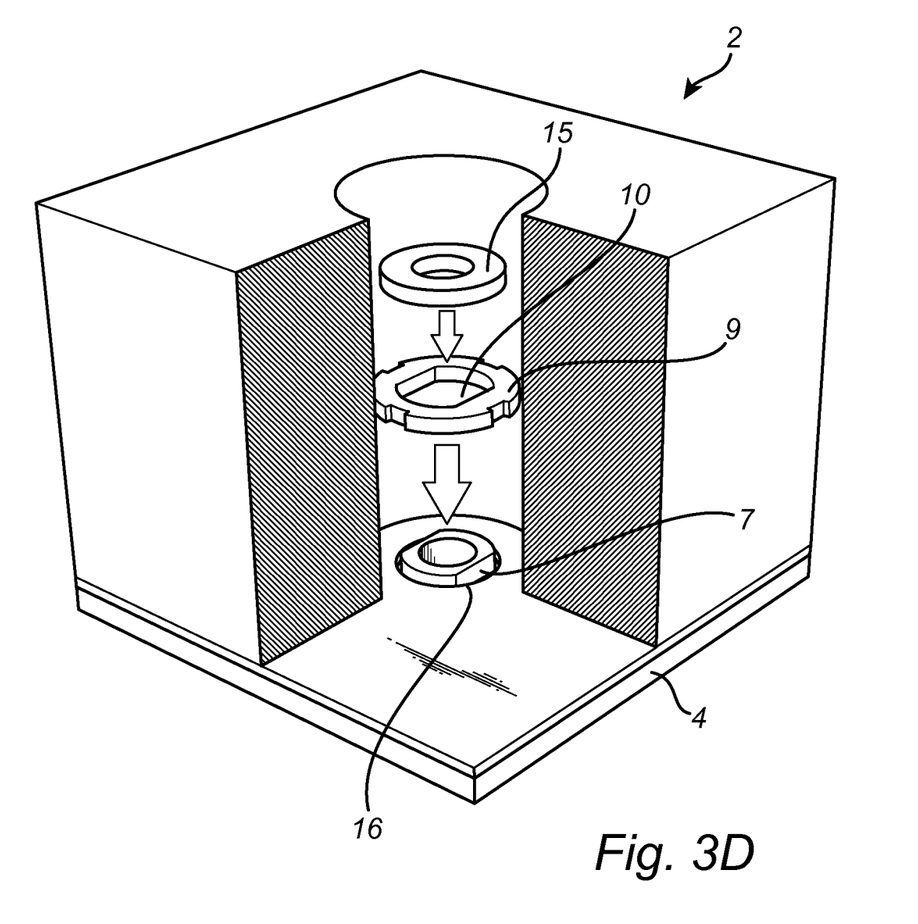
Figure 3E:
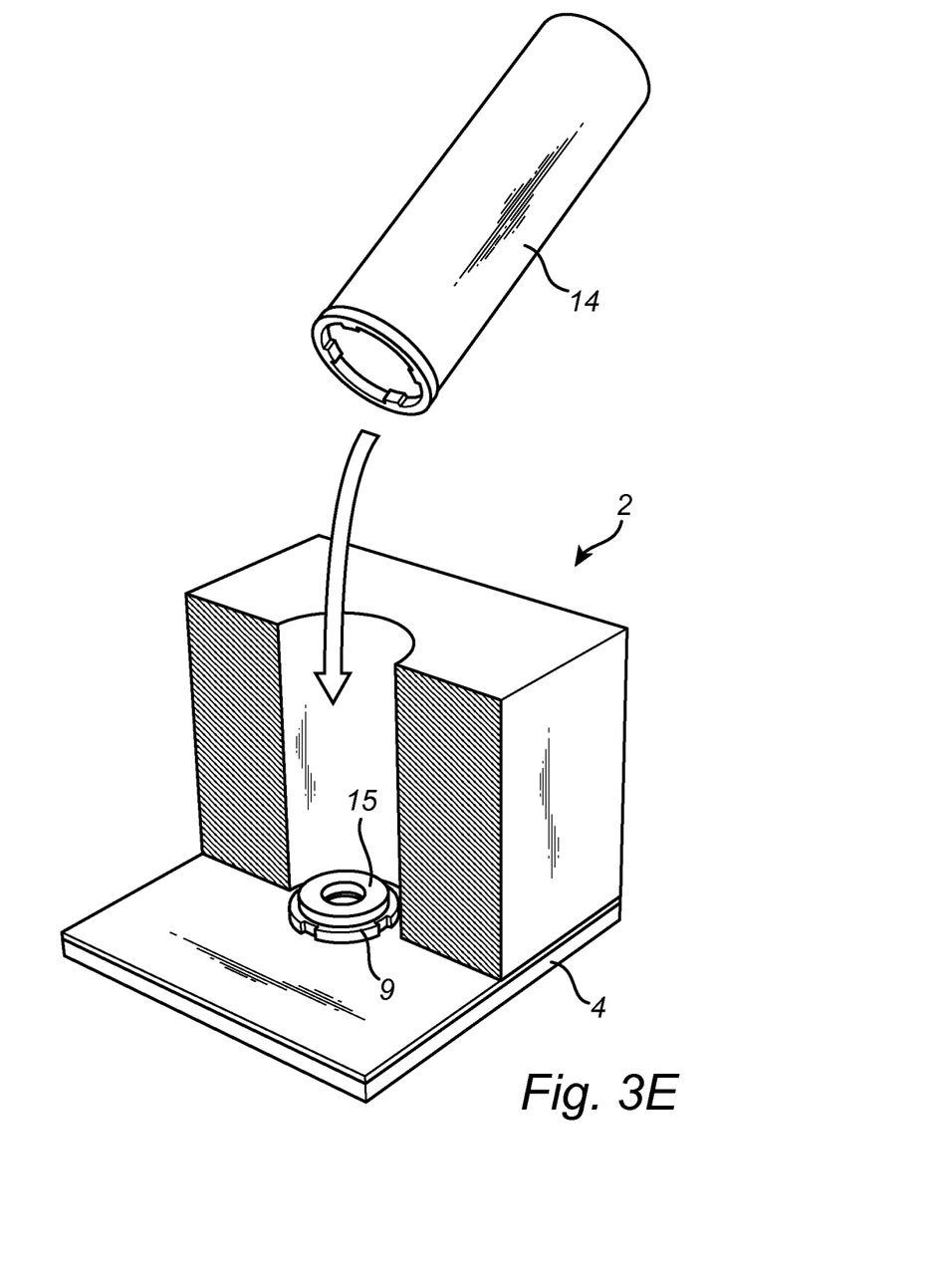
Figure 3F:
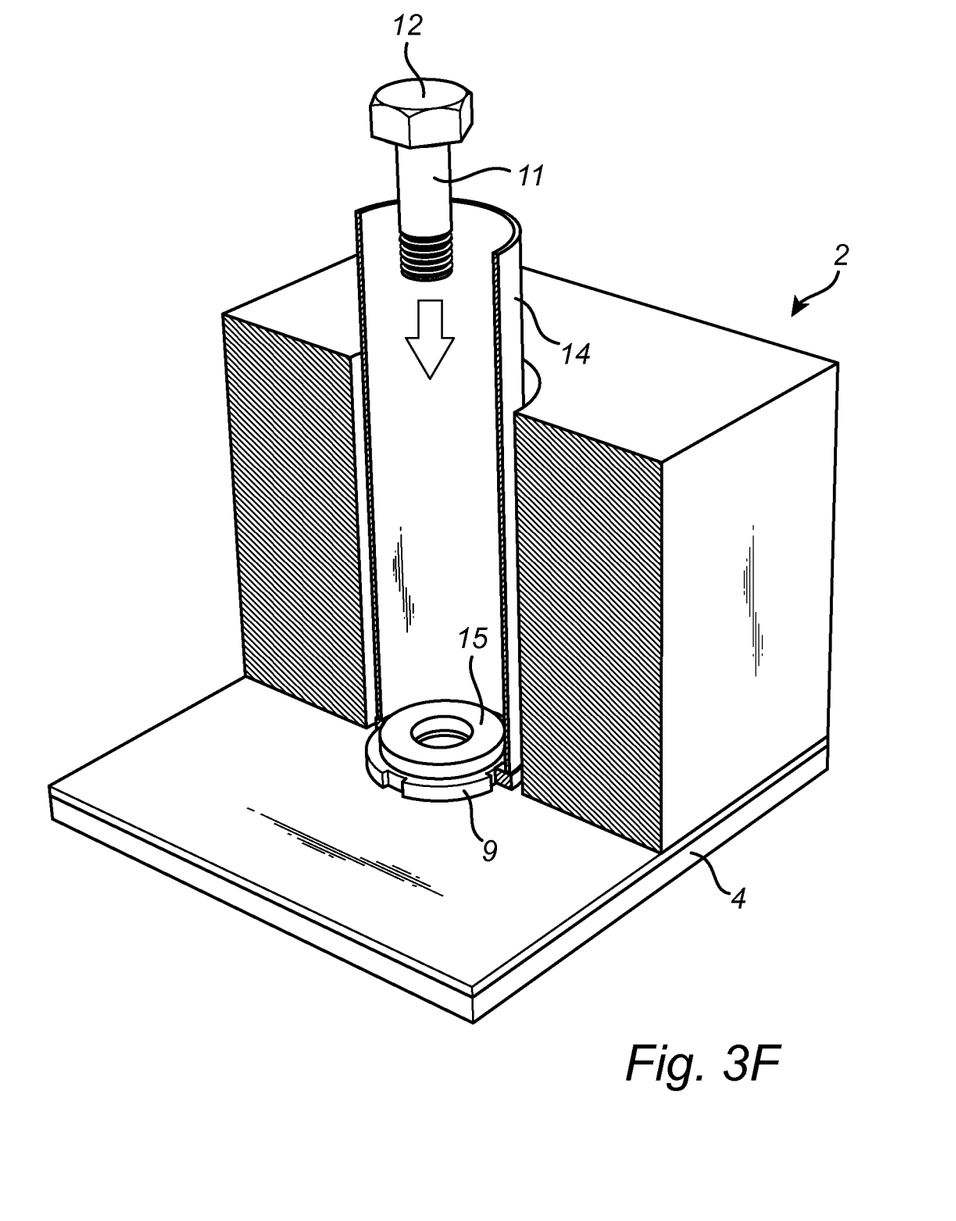
Figure 3G:
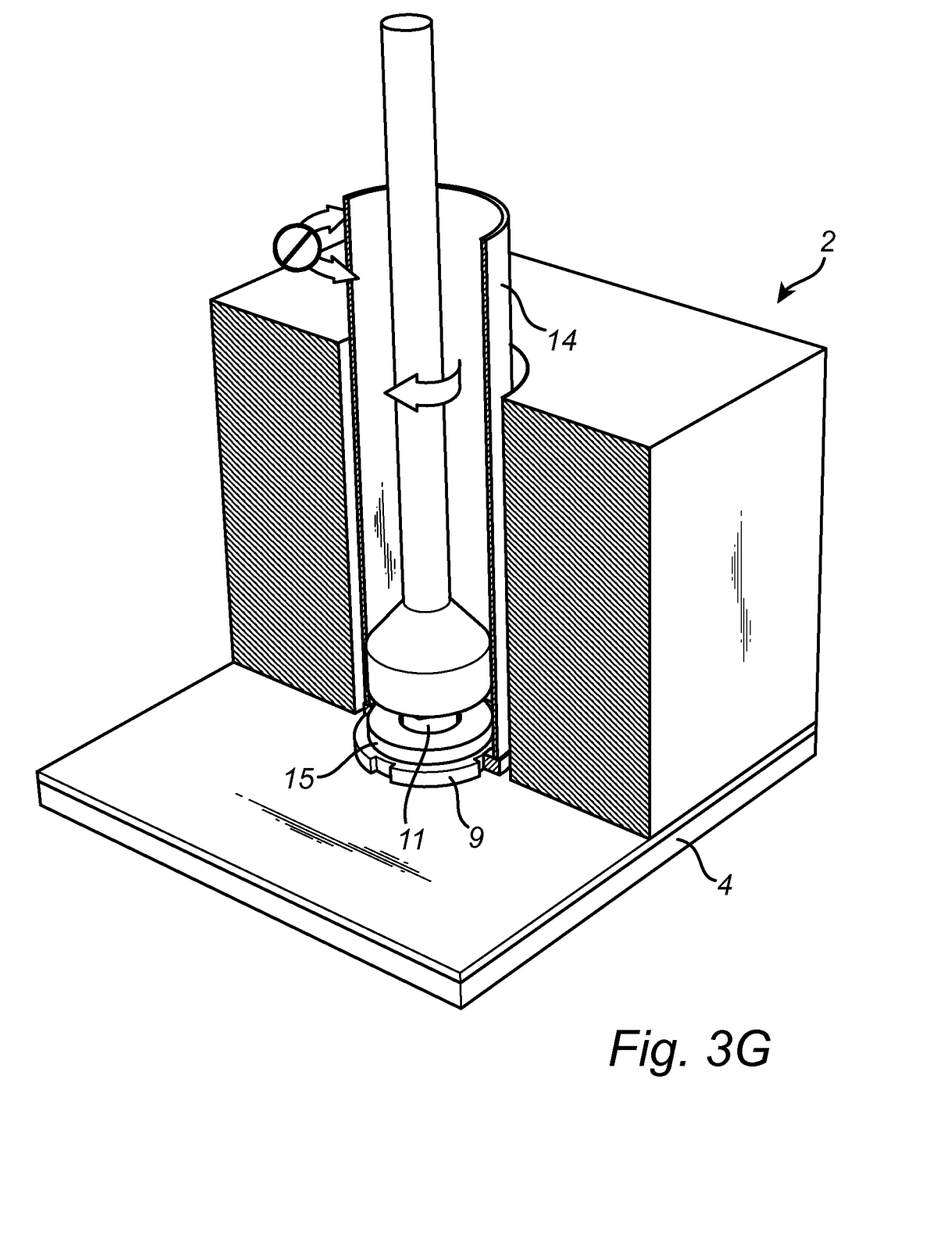
Figure 3H:
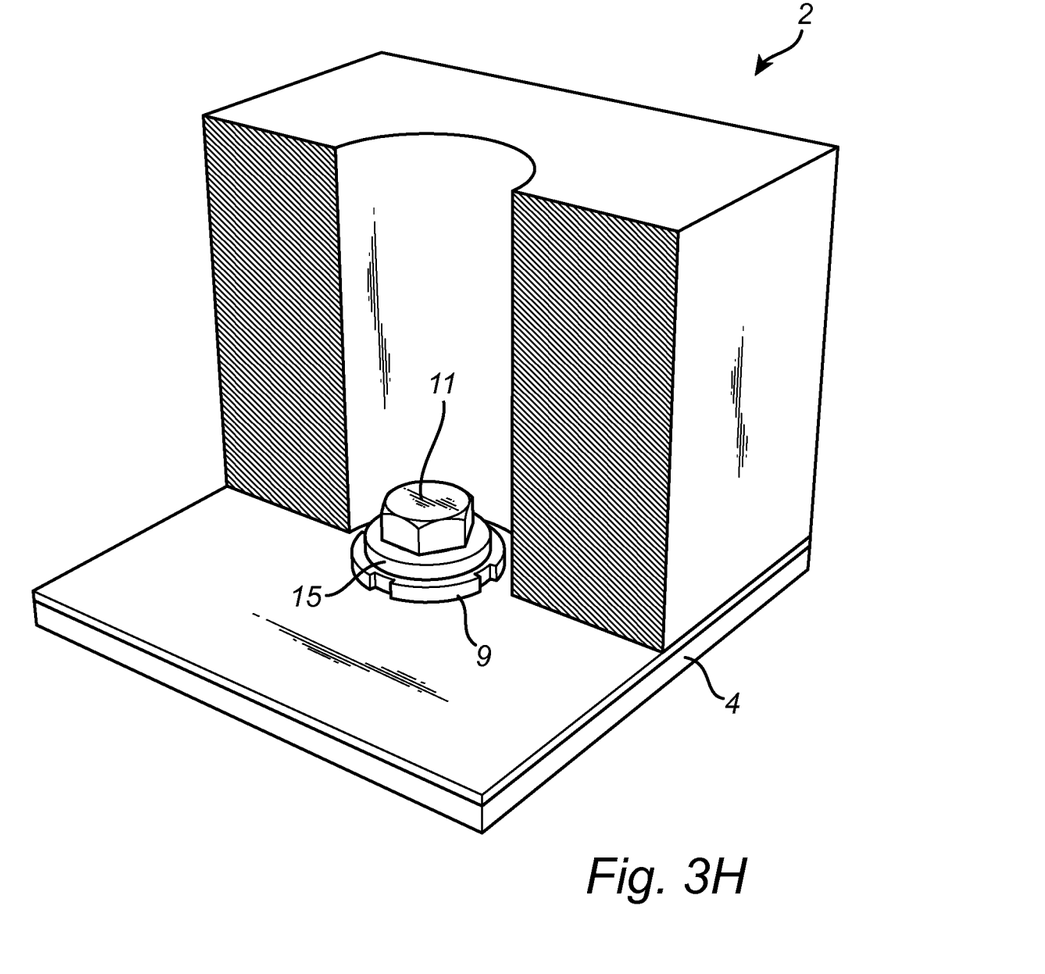

When the method is used for fastening the lining element 2 to the surface 3 of the body steel plate 4 for the first time, for example during a manufacturing process, the following steps (in a suitable order) need to be included: inserting the rivet nut 6 having the rivet head 7 into the through hole 8 of the body steel plate 4 such that the rivet head 7 engages the surface 3 (FIG. 3A); compressing the rivet nut 6 for attachment to the body steel plate 4 (FIG. 3B); placing the lining element 2 on the surface 3 which has the rivet head 7 received therein to extend beyond the mounting hole 21 (FIG. 3C); and inserting and tightening the bolt 11 having the bolt head 12 into the rivet nut 6, for pressing the fastening portion 16 of the lining element 2 against the surface 3 of the body steel plate 4 (FIGS. 3F and 3G).

In the embodiment disclosed in FIG. 3A to 3H, the method further comprises placing the rotational-locking washer 9 on the fastening portion 16 of the lining element 2 with the rivet nut 6 being received in the central opening 10 of the rotational-locking washer 9 (FIG. 3D). Here, the central opening 10 is shaped and configured to receive the rivet head 7 in a rotationally locked engagement.

Thereafter, a tool 14 can be engaged in the tool-engagement portion 14 of the rotational-locking washer 9 for preventing rotation of the rotational-locking washer 9, and thereby preventing rotation of the rivet nut 6, during tightening of the bolt 11 (FIG. 3E). Since the amount of space available in such opening is limited, it is advantageous that the tool engagement portion of the washer is accessible from above, i.e. the tool can simply be pushed on to the washer into a rotation preventing engagement.

Before inserting and tightening the bolt 11 into the rivet nut 6, a fastening washer 15 is placed between the bolt head 12 and the fastening portion 16 (specifically between the bolt head 12 and the and the rotational-locking washer 9) for axial transmission of force from the bolt head 12 to the fastening portion 16 (FIG. 3D).

When the method is used for fastening the lining element 2 to the surface 3 of the body steel plate 4 upon replacement, for example during a maintenance process, it could be sufficient with the following steps: placing the lining element 2 on the surface 3 (FIG. 3C); and inserting and tightening a bolt 11 having a bolt head 12 into the rivet nut 6, for pressing the fastening portion 16 of the lining element 2 against the surface 3 of the body steel plate 4 (FIGS. 3F and 3G). Naturally, further steps (as disclosed above) could also be suitable during replacement of the lining elements 2.

Figure 4A:
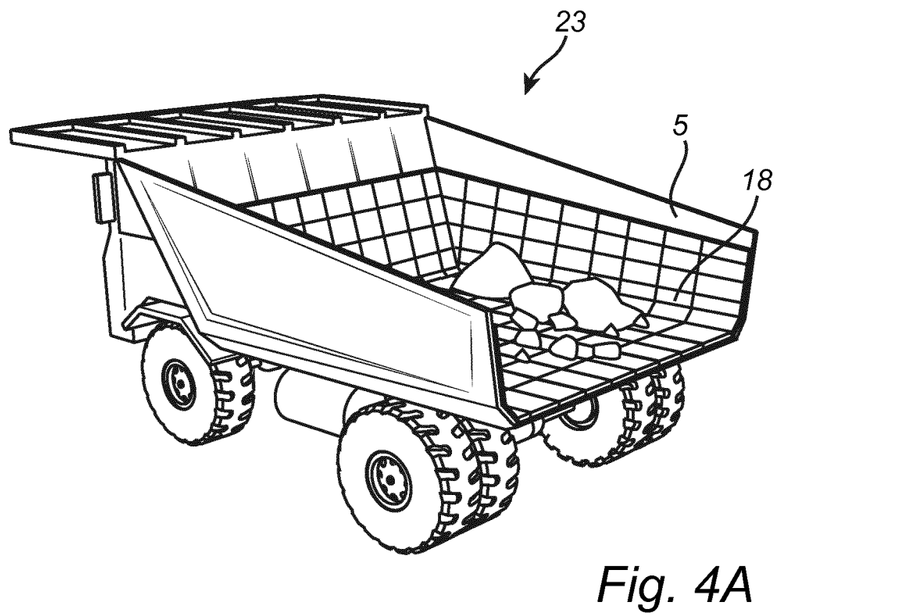
FIG. 4A is a perspective view of a truck according to a fourth aspect of the invention equipped with a haul truck body.

FIG. 4A illustrates a truck 23 having a haul truck body 5 comprising an assembly 17 as described above.

Figure 4B:
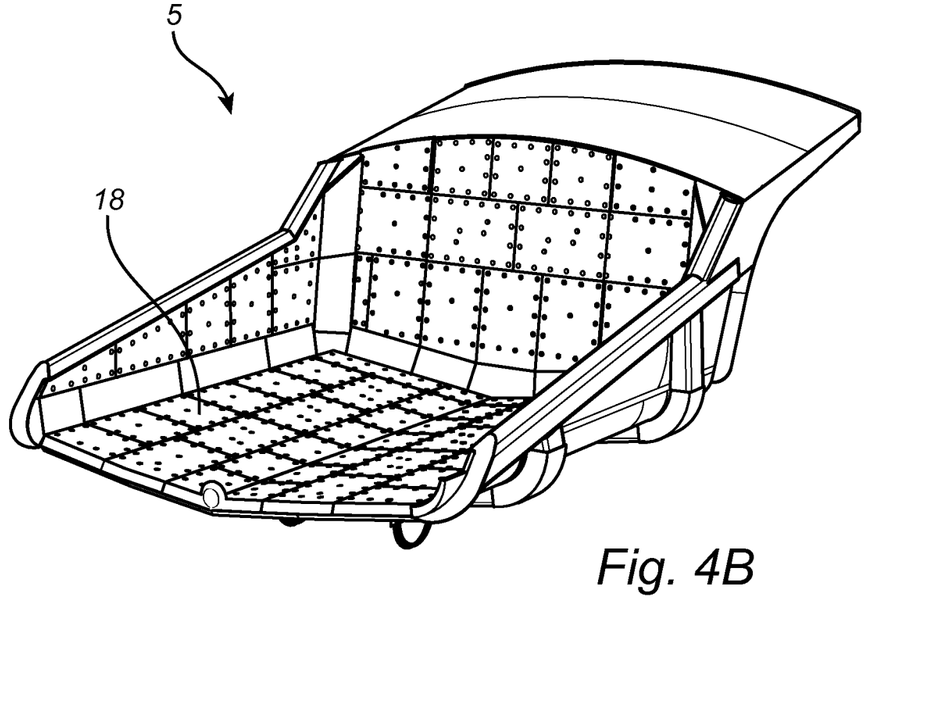
FIG. 4B is a perspective view of another exemplary embodiment of the haul truck body.

In FIG. 4B, another embodiment of the haul truck body 5 is illustrated.

It is understood that other variations in the present invention are contemplated and in some instances, some features of the invention can be employed without a corresponding use of other features. Accordingly, it is appropriate that the appended claims be construed broadly in a manner consistent with the scope of the invention.

For instance, it should be noted that it is not necessary to fasten all of the lining elements 2 to the body steel plate 4 using the fastening device 1. Some lining elements 2, for example lining elements 2 present on the side walls may be fastened using conventional fastening methods, such as welded stud bolts.

Naturally, the number, size and shape of the components of the fastening device 1 and the assembly 17 may be variated in any suitable way without departing from the scope of the invention.

The invention claimed is:

1. A method for use in heavy-duty machinery for fastening a lining element to a surface of a body steel plate, such as a haul truck body, the lining element having at least one fastening portion defining a mounting hole, wherein the method comprises:
   placing the lining element on the surface, the surface having a rivet nut with a rivet head received therein;
   inserting and tightening a bolt having a bolt head into the rivet nut, for pressing at least one fastening portion of the lining element against the surface of the body steel plate;
   placing a washer on the fastening portion of the lining element with the rivet nut being received in a central opening of the washer, wherein the washer is a rotational-locking washer and the central opening is shaped and configured to receive the rivet head in a rotationally locked engagement;
   prior to inserting and tightening the bolt into the rivet nut, further comprising placing a fastening washer between the bolt head and the fastening portion for axial transmission of force from the bolt head to the fastening portion; and
   engaging a tool in at least one tool-engagement portion of the washer for preventing rotation of the washer, and thereby preventing rotation of the rivet nut, during tightening of the bolt,
   wherein the engaging of the tool is done parallel to a longitudinal axis of bolt.

2. The method according to claim 1, further comprising:
   initially inserting a rivet nut having a rivet head into a through hole of the body steel plate such that the rivet head engages the surface; and
   compressing the rivet nut for attachment to the body steel plate.

3. The method of claim 1 wherein the bolt head projects beyond the central opening of the rotational-locking washer thereby pressing the washer toward the surface of the body steel plate.

4. A fastening device for use in heavy-duty machinery for fastening a lining element to a surface of a body steel plate, such as a haul truck body, wherein the fastening device comprises:
   a rivet nut having a rivet head and an inner threading, the rivet nut being configured to be inserted into a through hole of the body steel plate such the rivet head engages the surface and being configured to be subsequently compressed for attachment to the body steel plate;
   a rotational-locking washer having a central opening being shaped and configured to receive the rivet head in a rotationally locked engagement;
   a fastening bolt being configured to engage with the inner threading of the rivet nut and having a bolt head configured to press the rotational-locking washer towards the surface of the body steel plate; and
   a fastening washer for arrangement between the bolt head and a fastening portion of the lining element for axial transmission of force from the bolt head to the fastening portion of the lining element,
   wherein the rotational-locking washer further comprises at least one tool-engagement portion configured to engage with a tool for preventing rotation of the rotational-locking washer, and thereby preventing rotation of the rivet nut, during fastening of the lining element between the rotational-locking washer and the surface, wherein the tool engaging portion is accessible by a tool in a direction parallel a longitudinal axis of the fastening bolt.

5. The fastening device according to claim 4, wherein the fastening washer is arranged between the bolt head and the rotational-locking washer.

6. The fastening device according to claim 4, wherein the rivet head is non-circular.

7. The fastening device according to claim 4, wherein the shape of the central opening of the rotational-locking washer corresponds to the shape of the rivet head.

8. The fastening device according to claim 4, wherein the tool-engagement portion comprises at least one groove.

9. The fastening device according to claim 4, wherein the tool engaging portion is accessible by a tool from above.

10. The fastening device of claim 4 wherein the bolt head projects beyond the central opening of the rotational-locking washer.

11. An assembly, comprising:
    a body steel plate;
    a lining comprising a plurality of lining elements intended for a surface on the body steel plate subjected to wear, each lining element having an outwardly directed surface, over which material in the form of pieces or particles is intended to move, and having an inwardly directed surface intended to face the body steel plate; and
    a plurality of fastening devices according to claim 4 for fastening the lining elements to the surface of the body steel plate.

12. The assembly according to claim 11, wherein each lining element comprises a rubber lining and a steel reinforcement plate.

13. The assembly according to claim 11, wherein each lining element comprises at least one fastening portion formed in the steel reinforcement plate.

14. The assembly according to claim 13, wherein the fastening portion defines a mounting hole through which the rivet nut of the fastening device is configured to be inserted.

15. The assembly according to claim 11, wherein each lining element comprises at least one opening in the rubber lining for access to the fastening portion of the steel reinforcement plate.

16. A truck having a haul truck body comprising:
    a body steel plate;
    a lining comprising a plurality of lining elements intended for a surface on the body steel plate subjected to wear, each lining element having an outwardly directed surface, over which material in the form of pieces or particles is intended to move, and having an inwardly directed surface intended to face the body steel plate; and
    a plurality of fastening devices according to claim 4 for fastening the lining elements to the surface of the body steel plate.

* * * * *